United States Patent
Chastain et al.

(10) Patent No.: US 9,124,573 B2
(45) Date of Patent: Sep. 1, 2015

(54) APPARATUS AND METHOD FOR MANAGING USE OF SECURE TOKENS

(71) Applicants: AT&T Intellectual Property I, LP, Atlanta, GA (US); AT&T Mobility II, LLC, Atlanta, GA (US)

(72) Inventors: Walter Cooper Chastain, Atlanta, GA (US); Stephen Emille Chin, Marietta, GA (US); Samuel King, Atlanta, GA (US); Michael Suozzo, Norcross, GA (US); Nicholas Vondrak, Atlanta, GA (US); Ismaila Wane, Atlanta, GA (US)

(73) Assignees: AT&T INTELLECTUAL PROPERTY I, LP, Atlanta, GA (US); AT&T MOBILITY II, LLC, Atlanta, GA (US)

( * ) Notice: Subject to any disclaimer, the term of this patent is extended or adjusted under 35 U.S.C. 154(b) by 153 days.

(21) Appl. No.: 14/046,138

(22) Filed: Oct. 4, 2013

(65) Prior Publication Data

US 2015/0100788 A1    Apr. 9, 2015

(51) Int. Cl.
*H04L 29/06* (2006.01)
*H04W 12/06* (2009.01)

(52) U.S. Cl.
CPC ............ *H04L 63/0807* (2013.01); *H04L 63/08* (2013.01); *H04L 63/0869* (2013.01); *H04W 12/06* (2013.01)

(58) Field of Classification Search
CPC . H04L 63/0807; H04L 63/06; H04L 63/0838; H04L 63/0869; H04L 63/045; H04L 63/123; H04L 9/083; H04L 9/32
USPC ............................ 726/3, 9; 380/277; 713/169
See application file for complete search history.

(56) References Cited

U.S. PATENT DOCUMENTS

| | | |
|---|---|---|
| 5,742,910 A | 4/1998 | Gallant et al. |
| 5,774,544 A | 6/1998 | Lee et al. |

(Continued)

FOREIGN PATENT DOCUMENTS

| | | |
|---|---|---|
| AU | 2010315111 A1 | 6/2012 |
| CA | 2823685 A1 | 2/2012 |

(Continued)

OTHER PUBLICATIONS

"Over-The-Air Platform Security Review", Mandiant Intelligent Information Security, 6 pgs., Aug. 17, 2010.

(Continued)

*Primary Examiner* — Justin T Darrow
*Assistant Examiner* — Hee Song
(74) *Attorney, Agent, or Firm* — Guntin & Gust, PLC; Ed Guntin

(57) ABSTRACT

A system that incorporates the subject disclosure may perform, for example, operations including receiving an encrypted secure token from a secure token application function that is remote from the communication device, storing the encrypted secure token in a secure element memory of the secure element, accessing user input requesting the encrypted secure token where the secure device processor is separate from the secure element and is in communication with the secure element, generating a modified secure token by adding identification information to the encrypted secure token and by performing a second encryption of the encrypted secure token with the identification information, receiving the modified secure token from the secure element, and providing the modified secure token to a receiving device. Other embodiments are disclosed.

19 Claims, 11 Drawing Sheets

(56) References Cited

U.S. PATENT DOCUMENTS

| | | |
|---|---|---|
| 6,014,561 A | 1/2000 | Molne |
| 7,165,173 B1 | 1/2007 | Herle |
| 7,185,362 B2 | 2/2007 | Hawkes et al. |
| 7,239,704 B1 | 7/2007 | Maillard et al. |
| 7,269,732 B2 | 9/2007 | Kilian-Kehr |
| 7,382,881 B2 | 6/2008 | Uusitalo et al. |
| 7,454,233 B2 | 11/2008 | Lu et al. |
| 7,472,123 B2 | 12/2008 | Hamatsu |
| 7,606,560 B2 | 10/2009 | Labrou et al. |
| 7,715,823 B2 | 5/2010 | Bravo et al. |
| 7,751,567 B2 | 7/2010 | Quick, Jr. et al. |
| 8,032,756 B2 | 10/2011 | Inami |
| 8,098,818 B2 | 1/2012 | Grilli et al. |
| 8,165,635 B2 | 4/2012 | Khan et al. |
| 8,166,524 B2 | 4/2012 | Sentinelli |
| 8,213,612 B2 | 7/2012 | Kaabouch et al. |
| 8,244,181 B2 | 8/2012 | Shuo |
| 8,271,025 B2 | 9/2012 | Brisebois et al. |
| 8,333,321 B2 | 12/2012 | Gressel et al. |
| 8,346,287 B2 | 1/2013 | King et al. |
| 8,380,171 B2 | 2/2013 | Link et al. |
| 8,387,119 B2 | 2/2013 | Patel et al. |
| 8,391,837 B2 | 3/2013 | Corda |
| 8,417,952 B2 | 4/2013 | Cheng et al. |
| 8,494,908 B2 | 7/2013 | Herwig et al. |
| 8,503,376 B2 | 8/2013 | Cha et al. |
| 8,505,085 B2 | 8/2013 | Logan et al. |
| 8,510,559 B2 | 8/2013 | Guccione et al. |
| 8,533,803 B2 | 9/2013 | Cha et al. |
| 8,738,898 B2 | 5/2014 | Herwono et al. |
| 2002/0040936 A1 | 4/2002 | Wentker et al. |
| 2003/0129965 A1 | 7/2003 | Siegel |
| 2003/0186722 A1 | 10/2003 | Weiner |
| 2004/0240671 A1 | 12/2004 | Hu et al. |
| 2005/0002407 A1 | 1/2005 | Shaheen et al. |
| 2005/0202803 A1 | 9/2005 | Mahalal |
| 2006/0165060 A1 | 7/2006 | Dua |
| 2006/0206710 A1 | 9/2006 | Gehrmann |
| 2006/0269061 A1 | 11/2006 | Balasubramanian et al. |
| 2007/0101122 A1 | 5/2007 | Guo |
| 2008/0005559 A1 | 1/2008 | Johnson |
| 2008/0010470 A1 | 1/2008 | McKeon et al. |
| 2008/0304458 A1 | 12/2008 | Aghvami et al. |
| 2009/0163235 A1 | 6/2009 | Michaels et al. |
| 2009/0191857 A1 | 7/2009 | Horn et al. |
| 2009/0220091 A1 | 9/2009 | Howard |
| 2009/0288012 A1 | 11/2009 | Hertel et al. |
| 2009/0327138 A1 | 12/2009 | Mardani et al. |
| 2010/0037230 A1 | 2/2010 | Potonniee et al. |
| 2010/0062808 A1 | 3/2010 | Cha et al. |
| 2010/0281251 A1 | 11/2010 | Arauz Rosado |
| 2010/0299731 A1 | 11/2010 | Atkinson |
| 2010/0306531 A1 | 12/2010 | Nahari |
| 2011/0035584 A1 | 2/2011 | Meyerstein et al. |
| 2011/0208600 A1 | 8/2011 | Aharoni et al. |
| 2011/0211699 A1 | 9/2011 | Ma et al. |
| 2011/0296182 A1 | 12/2011 | Jia et al. |
| 2011/0302017 A1 | 12/2011 | Marti et al. |
| 2011/0302408 A1 | 12/2011 | McDermott et al. |
| 2012/0028609 A1 | 2/2012 | Hruska |
| 2012/0036042 A1 | 2/2012 | Graylin et al. |
| 2012/0142332 A1 | 6/2012 | Li |
| 2012/0159163 A1 | 6/2012 | von Behren et al. |
| 2012/0172089 A1 | 7/2012 | Bae et al. |
| 2012/0185661 A1 | 7/2012 | Desai et al. |
| 2012/0187184 A1 | 7/2012 | Challa et al. |
| 2012/0190354 A1 | 7/2012 | Merrien et al. |
| 2012/0208597 A1 | 8/2012 | Billman |
| 2012/0246476 A1 | 9/2012 | Zhuang et al. |
| 2012/0311563 A1 | 12/2012 | Lee et al. |
| 2013/0012168 A1 | 1/2013 | Rajadurai et al. |
| 2013/0023235 A1 | 1/2013 | Fan et al. |
| 2013/0041830 A1* | 2/2013 | Singh et al. ............ 705/65 |
| 2013/0067232 A1 | 3/2013 | Cheung et al. |
| 2013/0145455 A1* | 6/2013 | Vijayshankar et al. ...... 726/16 |
| 2013/0152208 A1 | 6/2013 | King et al. |
| 2013/0173759 A1 | 7/2013 | Herse et al. |
| 2013/0203465 A1 | 8/2013 | Ali et al. |
| 2014/0045462 A1 | 2/2014 | Warnez |
| 2014/0057680 A1 | 2/2014 | Proust et al. |
| 2014/0215589 A1* | 7/2014 | Dietrich et al. ............ 726/6 |
| 2014/0243022 A1 | 8/2014 | L'Heriteau et al. |

FOREIGN PATENT DOCUMENTS

| | | |
|---|---|---|
| EP | 1257922 B1 | 6/2006 |
| EP | 1865437 A2 | 12/2007 |
| EP | 1480476 B1 | 10/2008 |
| EP | 2041913 A1 | 4/2009 |
| EP | 2113856 A1 | 11/2009 |
| EP | 2223252 A1 | 9/2010 |
| KR | 2013027097 | 3/2013 |
| WO | 02063517 A2 | 8/2002 |
| WO | 03046719 A2 | 6/2003 |
| WO | WO03046719 | 6/2003 |
| WO | 2007079636 A1 | 7/2007 |
| WO | WO2007079636 | 7/2007 |
| WO | 2008059353 A1 | 5/2008 |
| WO | 2008149196 A1 | 12/2008 |
| WO | WO2009/046400 | 4/2009 |
| WO | WO2010051715 | 5/2010 |
| WO | WO2011/115407 | 9/2011 |
| WO | 2012110880 A1 | 8/2012 |
| WO | 2012151571 A2 | 11/2012 |
| WO | 2013006116 A2 | 1/2013 |
| WO | 2013/036009 | 3/2013 |
| WO | 2013/050296 | 11/2013 |

OTHER PUBLICATIONS

"The OTA Platform in the World of LTE", 14 pgs., Jan. 2011.
"3rd Generation Partnership Project; Technical Specification Group Core Network and Terminals; Characteristics of the Universal Subscriber Identity Module (USIM) application", Release 11, 2012.
"3rd Generation Partnership Project; Technical Specification Group Core Network and Terminals; Remote APDU Structure for (U)SIM Toolkit applications", Release 10, 2012.
"3rd Generation Partnership Project; Technical Specification Group Core Network and Terminals; Secured packet structure for (Universal) Subscriber Identity Module (U)SIM Toolkit applications", Release 10, 2012.
"3rd Generation Partnership Project; Technical Specification Group Core Network and Terminals; UICC-terminal interface; Physical and logical characteristics", Release 10, 2011.
"3rd Generation Partnership Project; Technical Specification Group Core Network and Terminals; Universal Subscriber Identity Module (USIM) Application Toolkit (USAT)", Release 11, 2012.
"GlobalPlatform Card Confidential Card Content Management Card Specification v2.2—Amendment A", 2011.
"GlobalPlatform Card Contactless Services Card Specification v2.2—Amendment C", 2012.
"GlobalPlatform Card Remote Application Management over HTTP Card Specification v2.2—Amendment B", 2012.
"GlobalPlatform Card Security Upgrade for Card Content Management Card Specification v 2.2—Amendment E", 2011.
"GlobalPlatform Card Specification", Version 2.2.1, 2011.
"GlobalPlatform Card Technology Secure Channel Protocol 03 Card Specification v 2.2—Amendment D", 2009.
"GlobalPlatform Device Secure Element Remote Application Management", May 2011.
"GlobalPlatform Device Technology Secure Element Access Control", Version 1.0, May 2012.
"GlobalPlatform Device Technology TEE System Architecture", Dec. 2011.
"GlobalPlatform Key Management System", Functional Requirements, Nov. 2003.
"GlobalPlatform System Messaging Specification for Management of Mobile-NFC Services", Feb. 2011.

(56) References Cited

OTHER PUBLICATIONS

"Reprogrammable SIMs: Technology, Evolution and Implications", csmg, Sep. 25, 2012.
"Smart Cards; Card Application Tookit (CAT)", Release 11, 2012.
"Smart Cards; ETSI numbering system for telecommunication application providers", Release 11, 2011.
"Smart Cards; Machine to Machine UICC; Physical and logical characteristics", Release 9, 2011.
"Smart Cards; Remote APDU structure for UICC based applications", Release 11, 2012.
"Smart Cards; Secured packet structure for UICC based applications", Release 11, 2012.
"Smart Cards; Security mechanisms for UICC based Applications—Functional requirements", Release 8, 2008.
"Smart Cards; UICC Application Programming Interface (UICC API) for Java Card™", Release 9, 2012.
"Smart Cards; UICC-Terminal Interface; Physical and logical characteristics", Release 10, 2011, 179 pages.
"Universal Mobile Telecommunications System (UMTS); UICC-terminal interface; Physical and logical characteristics", Release 10, 2011.
Global Platform, , "Secure Element Remote Application Management", Version 1.0, May 2011.
Chen, "An efficient end-to-end security mechanism for IP multimedia subsystem", Computer Communications, 2008, vol. 31.18, pp. 4259-4268.
Imhontu, et al., "A survey on near field communication in mobile phones & PDAs", Dissertation Halmstad University, 2010. http://hh.diva-portal.org/smash/get/diva2:385433/FULLTEXT01.
Kim, Jong-Min et al., "A Study of Coupons issuance System Considering of User Convenience Based on NFC", 3rd International Conference on Computer Science and Information Technology (ICCSIT'2013) Jan. 4-5, 2013 Bali (Indonesia). http://psrcentre.org/images/extraimages/113118.pdf.
Kounelis, Ioannis et al., "Secure Middleware for Mobile Phones and UICC Applications", Mobile Wireless Middleware, Operating Systems, and Applications, Springer Berlin Heidelberg, 2012, 143-152.
Kounelis, Ioannis et al., "Security of service requests for cloud based m-commerce", MIPRO, 2012 Proceedings of the 35th International Convention, IEEE, 2012.
Meyerstein, et al., "Security Aspects of Smart Cards vs. Embedded Security in Machine-to-Machine (M2M) Advanced Mobile Network Applications", InterDigital Communications Corporation LLC, First International ICST Conference: MobiSec 2009, Security and Privacy in Mobile Information and Communication Systems, p. 214-225, Jun. 3-5, 2009.
Nagalakshmi, et al., "Modified Protocols for Internet Key Exchange (IKE) Using Public Encryption and Signature Keys", Information Technology: New Generations (ITNG), 2011 Eighth International Conference on, 2011, pp. 376, 381.
Zhang, et al., "Cryptographic Key Agreement Protocol Simulation", Semantics Knowledge and Grid (SKG), 2010 Sixth International Conference on, 2010, pp. 418, 419.

\* cited by examiner

100

200

300

400

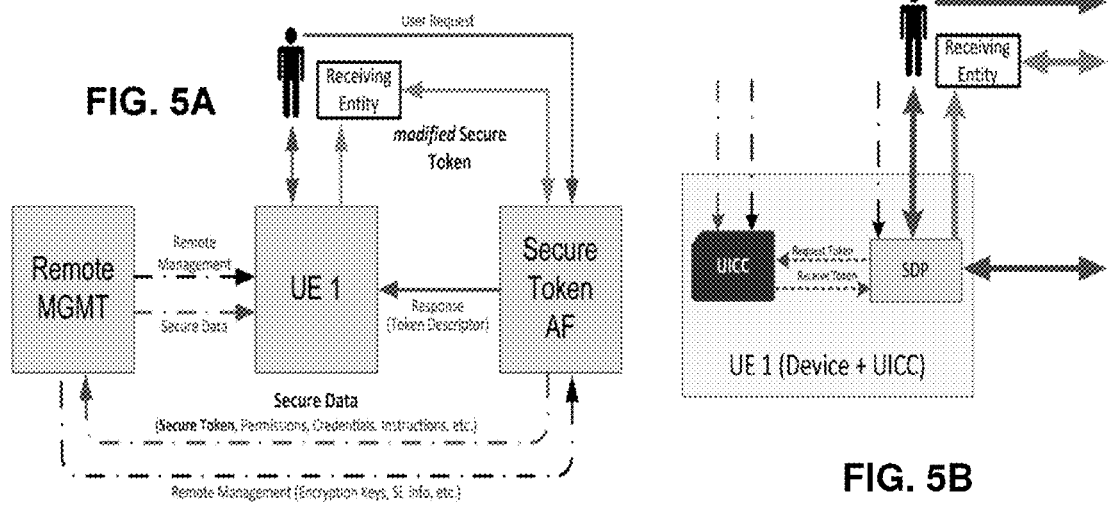
FIG. 5A
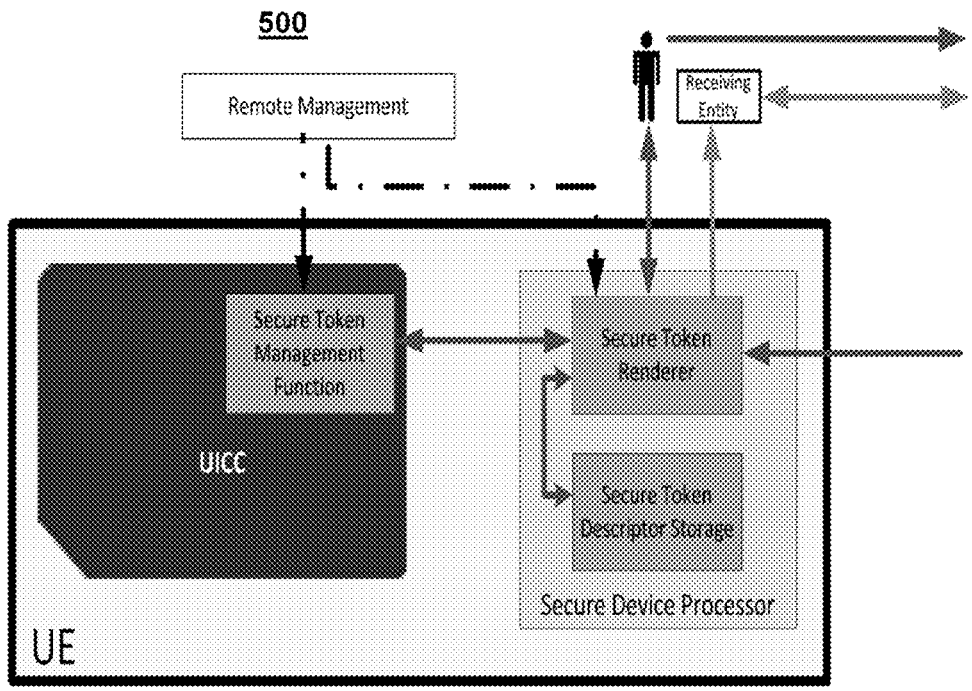
FIG. 5B
FIG. 5C

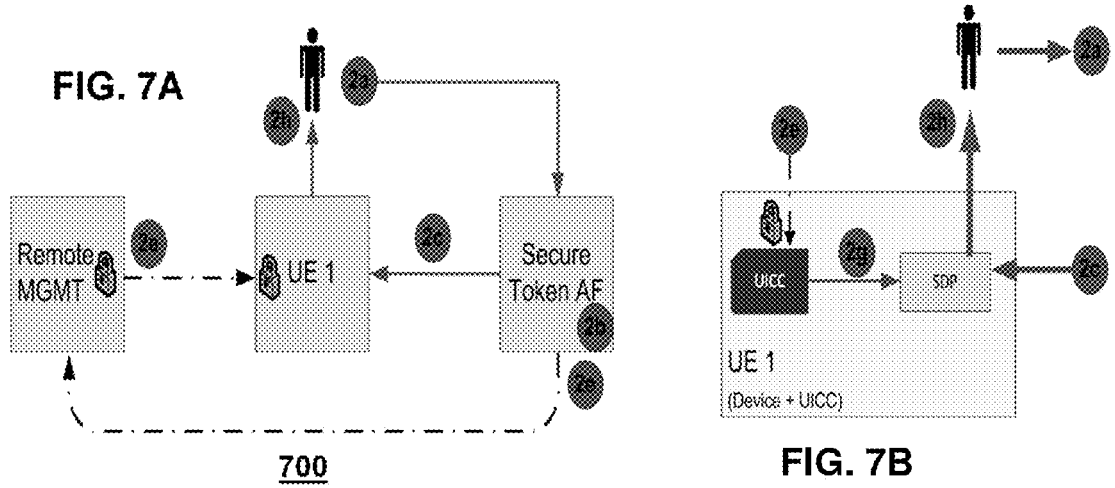
FIG. 7A
FIG. 7B
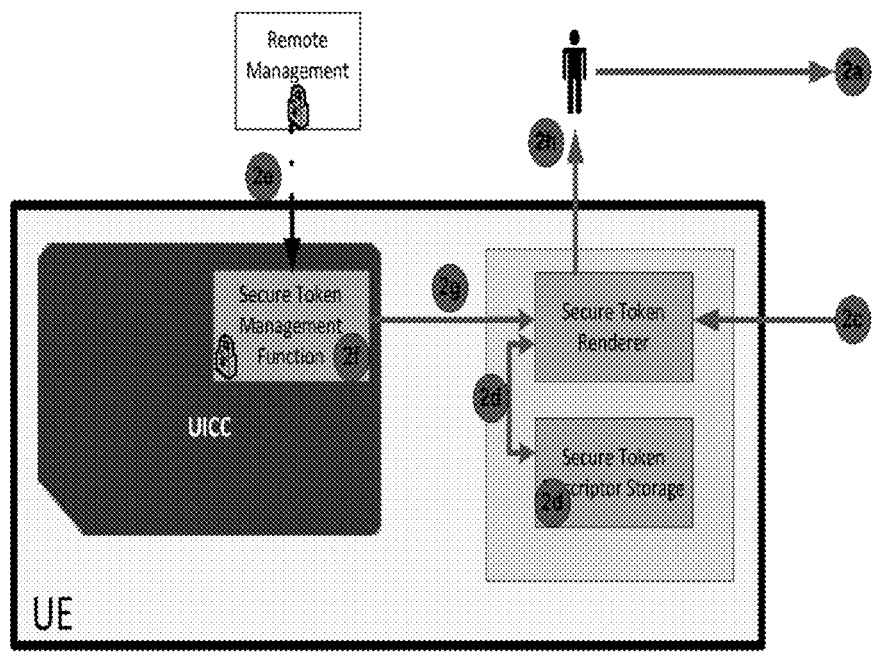
FIG. 7C

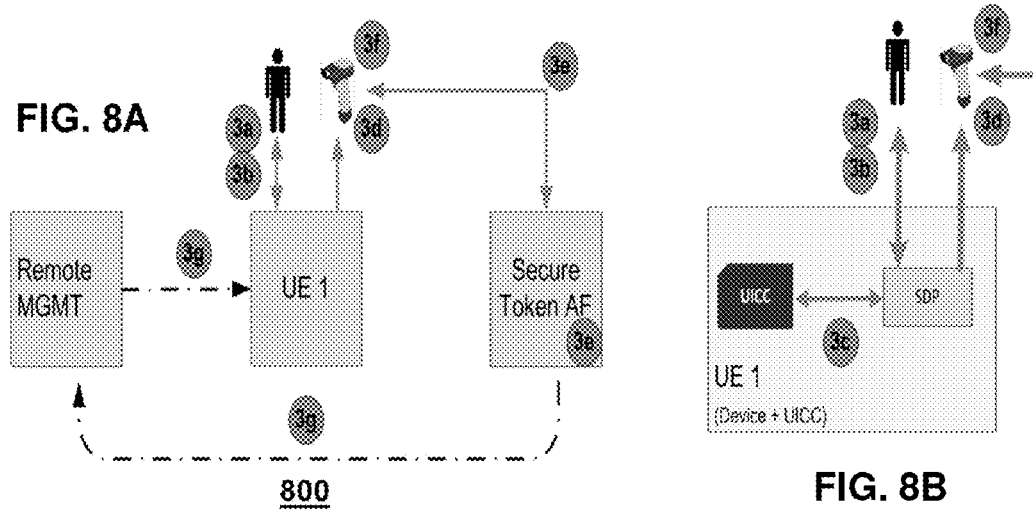
FIG. 8A
FIG. 8B
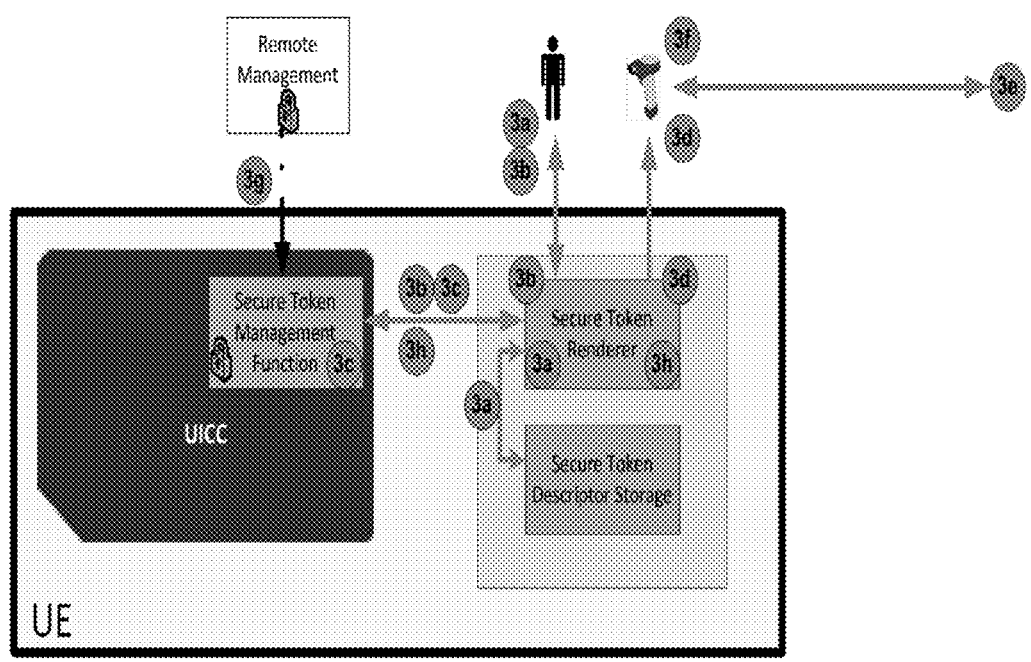
FIG. 8C

900

__US 9,124,573 B2__

APPARATUS AND METHOD FOR MANAGING USE OF SECURE TOKENS

FIELD OF THE DISCLOSURE

The subject disclosure relates to an apparatus and method for managing use of secure tokens.

BACKGROUND

Electronic devices are being utilized with more frequency to conduct various types of transactions and exchanges of information. Tokens can be used as part of the transactions where the tokens are packets of information. However, these transactions require security due to the concern of fraud and theft.

Unfortunately tokens are often not secure. A picture of a token on one user's device could be taken by another device and replicated for fraudulent use. A malicious application could obtain the token information that is stored in the device and replicate it on a second device. A malicious application could obtain the token information and pass it to a third party that could replicate the token. This replicated token could then be used in place of the original.

BRIEF DESCRIPTION OF THE DRAWINGS

Reference will now be made to the accompanying drawings, which are not necessarily drawn to scale, and wherein:

FIGS. 5A-5C depict an illustrative embodiment of a system that can be used for managing secure tokens;

FIGS. 7A-7C depict an illustrative embodiment of a system that can be used for requesting a secure token;

FIGS. 8A-8C depict an illustrative embodiment of a system that can be used for presenting secure tokens;

DETAILED DESCRIPTION

Figure 1:
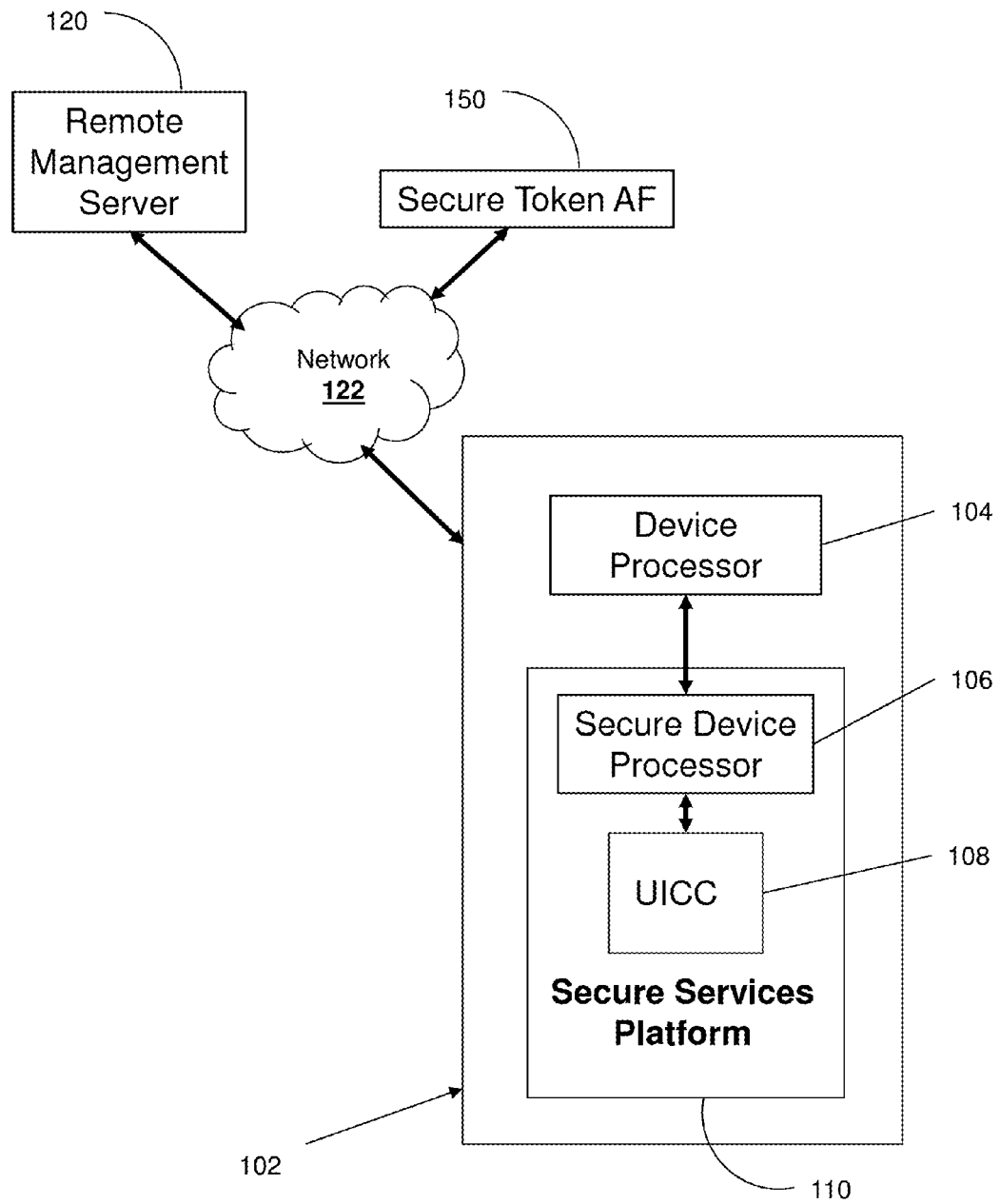
FIG. 1 depicts an illustrative embodiment of a system that enables use of a secure element and a secure device processor as part of a secure services platform for a communication device which provides security for tokens.

The subject disclosure describes, among other things, illustrative embodiments of utilizing a secure token which can be a token that has had cryptographic operations performed on it. A token can include usable information, that can be downloaded or otherwise provided to a device for the purpose of redeeming or otherwise utilizing, such as via an external entity. A secure token descriptor can be utilized which describes the secure token, such as to a user, to an application being executed on a communication device and/or to a remote device. A secure token management function can be utilized that may be located in a secure element (e.g., UICC) of a device, such as an end user device. A secure token renderer can be utilized which is located in a secure device processor (SDP) of the user device. A secure token descriptor storage can be provided which is located in the SDP. A remote management system or server can be provided which can remotely manage the secure token management function and/or the secure token renderer and/or which can remotely load secure tokens provided by the secure token application function into the secure token management function. The encrypted secure token can be decrypted to obtain token information which can be data extracted or otherwise deduced from the decrypted secure token.

In one or more embodiments, the secure token application function and/or the secure token management function can perform encryption, leading to a multiple (e.g., doubly) encrypted modified secure token. In one embodiment, the secure token application function can be contained within a single entity. In one embodiment, the secure token management function can perform additional encryption (described herein as "modification"), but the secure token application function may only encrypt the token once for transmission to the secure token management function. In this example, the secure token application function does not perform additional encryption, but it may perform two sets of decryption operations (one for the initial token and a second for the modified secure token). In one or more embodiments, the secure token application function may further decrypt the decrypted modified secure token using a transport key to obtain a received secure token. The received secure token can then be compared with a previous secure token that was generated and stored by the secure token application function. Other embodiments are included in the subject disclosure.

One embodiment of the subject disclosure includes a communication device having a secure element with a secure element memory having first executable instructions, where the secure element, responsive to executing the first executable instructions, performs first operations comprising receiving an encrypted secure token from a secure token application function that is remote from the communication device, and storing the encrypted secure token in the secure element memory. The communication device can have a secure device processor with a secure device processor memory having second executable instructions, where the secure device processor is separate from the secure element and is in communication with the secure element, and where the secure device processor, responsive to executing the second executable instructions, performs second operations including accessing user input requesting the encrypted secure token. The secure device processor can receive a modified secure token from the secure element, where the modified secure token is generated by the secure element by adding identification information to the encrypted secure token and by performing a second encryption of the encrypted secure token with the identification information. The secure device processor can provide the modified secure token to a receiving device to enable the receiving device to provide the modified secure token to the secure token application function for decrypting the modified secure token to analyze the identification information and to obtain token information for use by the receiving device. The secure element can create a modified secure token in different ways. Additional information can include information about the identity of the user and a timestamp. Other information may be included. The combination of the secure token and additional information can be encrypted by the secure element to create the modified secure token.

One embodiment of the subject disclosure is a method including receiving, by a secure element of a communication device, an encrypted secure token from a secure token application function that is remote from the communication device. The method can include storing the encrypted secure token in a secure element memory of the secure element. The method can include accessing, by a secure device processor of the communication device, user input requesting the encrypted secure token, where the secure device processor is separate from the secure element and is in communication with the secure element. The method can include generating, by the secure element, a modified secure token by adding identification information to the encrypted secure token and by performing a second encryption of the encrypted secure token with the identification information. The method can include receiving, by the secure device processor, the modified secure token from the secure element. The method can include providing, by the secure device processor, the modified secure token to a receiving device to enable the receiving device to provide the modified secure token to the secure token application function for decrypting the modified secure token to analyze the identification information and to obtain token information for use by the receiving device. In one embodiment, the identification information added to create the modified secure token can be user identification information. In another embodiment, the additional information can be other than user identification information. Time stamps can be utilized to determine the validity time of the modified secure token.

One embodiment of the subject disclosure is a method including providing, by a secure token application function, a token descriptor to a secure device processor of a communication device for storage at the secure device processor. The method can include providing, by the secure token application function, an encrypted secure token to a secure element of the communication device for storage at the secure element. The method can include receiving, by the secure token application function, a modified secure token from a receiving device that obtained the modified secure token from the communication device according to user input associated with the token descriptor. The method can include decrypting, by the secure token application function, the modified secure token to obtain the encrypted secure token and to obtain identification information including a digital signature. The method can include verifying, by the secure token application function, the digital signature. The method can include decrypting, by the secure token application function, the encrypted secure token to obtain a secure token. The method can include analyzing, by the secure token application function, the secure token to obtain token information. In one embodiment, the obtaining of the token information can be based on comparing a doubly decrypted modified secure token with a secure token that was generated and stored by the secure token application function. The method can include providing, by the secure token application function, a notification to the receiving device indicating an acceptance or denial of the token information. In one or more embodiments, the decryption of the encrypted secure token by the application function can allow for access to token information which is data that is extracted from the decrypted secure token or which is data that is generated based on an analysis of the decrypted secure token, such as data obtained from reading of a decrypted bar code which is serving as the secure token. The token information can take other forms, such as data that is generated from application of an algorithm to information extracted from the decryption of the encrypted secure token. In one or more embodiments, the encrypted secure token can be selected by one or more of a user of the communication device, an application being executed by the communication device, and/or a remote device. The selection can be based on various factors and can utilize various techniques, including selection based on token descriptors that are shared with the selecting entity (e.g., user, application or remote device).

In accordance with an embodiment of the disclosure, FIG. 1 depicts a system 100 that includes a communication device 102 connected to or otherwise in communication with a network 122 and provided with a secure services platform 110 enabling authentication of other communication devices and encrypted communication with those devices. It will be appreciated that the communication device 102 may be any device, including a user device, which has a secure element and a secure device processor. The term "user," in this example, refers to a human user of the communication device. However, in other embodiments, the user can be a machine that exchanges data with the communication device 102 after being authenticated to the communication device. Communication device 102 can include a device processor 104, a secure device processor 106 and a secure element 108. In this embodiment, secure element 108 can be a universal integrated circuit card (UICC). The UICC can be a secure computing platform and can offer a high level of security for storing encryption keys, authentication credentials, and the like. The UICC may be removable from the device. In other embodiments, the UICC may be embedded in the device and not removable. In other embodiments, the secure element 108 can be placed on a memory card or an embedded chip. The secure device processor (SDP) 106 can be logically and/or physically separate from the device processor 104, and can be connected to both the device processor and the UICC 108. In this embodiment, the SDP 106 can offer a higher level of security than the device processor 104, and can store and execute secure applications. The SDP 106 can, for example, run applications in a trusted execution environment. The secure element 108 and SDP 106 together can form a secure services platform 110 resident on the device 102. In this embodiment secure element 108, SDP 106 and device processor 104 can each have a security level associated therewith, and the security level associated with the SDP 106 can be intermediate between that of the secure element 108 and that of the device processor 104. The SDP and secure element 108 can use mutual authentication, as described in more detail below.

The secure element 108 and SDP 106 can communicate with a management (function) server 120, located remotely from device 102. The remote management server 120 can be a platform for provisioning and/or managing applications in the secure element 108 and SDP 106. The remote management server 120 can also manage data (such as keys, credentials, and so forth) that are used by the applications. Examples of remote management servers are described in U.S. patent application Ser. No. 13/679,479 filed on Nov. 16, 2012 and U.S. patent application Ser. No. 13/680,680 filed on Nov. 19, 2012, the disclosures of both of which are hereby incorporated by reference.

In this embodiment, user device 102 can be a wireless communication device connected to a cellular network 122. Network 122 can also be other types of networks operating according to various communication protocols, such as a WiFi network. In other embodiments, device 102 can be connected to other devices via a wired connection through a computer. In still other embodiments, user devices can communicate with each other using Bluetooth, infrared communications (IRDa) and/or near field communications (NFC). A communication session between user devices, wherein information is transferred between the users, can be effected by a wide variety of arrangements. A secure application server (SAS) can be used in some embodiments to establish a secure communication session between devices. However, a secure application server may not be used in embodiments where the communication session is established in a peer-to-peer manner, such as in Bluetooth, IRDa or NFC.

System 100 enables secure tokens to be securely downloaded, stored, and rendered for consumption within the device 102, such as a smartphone by using the secure element 108 (which may exist within the UICC or in another configuration) and the SDP 106 as a secure platform. The secure element 108 can be a highly secure computing platform for storing secrets, such as encryption keys and authentication credentials. In one or more embodiments, the secure element 108 can host and execute highly secure applets. The device processor 104 can sometimes be relatively unsecure but has the capability of storing and executing very large and processor intensive applications. Examples of the SDP 106 can include a Trusted Execution Environment (TEE) and embedded Secure Element (eSE). Together, the secure element 108 and SDP 106 can provide a secure means of downloading, storing, and rendering for consumption secure tokens.

In one embodiment, system 100 enables secure tokens to be requested by a user and created by a secure token application (server) function 150 which can be remote from the device 102. The secure token application function 150 may encrypt the secure token before transmitting to the secure element 108, such as via the remote management server 120. When the user wishes to consume the secure token, a modified secure token can be presented to a receiving entity device and transmitted back to the secure token application function 150 for verification. In one embodiment, the modified secure token can contain (or otherwise have added thereto) additional information associated with the user to verify the authenticity and validity of the secure token. In another embodiment, the modified token can be encrypted. The secure token application function 150 can decrypt the modified secure token if it was encrypted and then can analyze the additional information as well as the token itself to determine whether or not to accept the token.

The secure token can be in various forms. For example, the secure token can be 2D barcode and an example of a receiving entity device would be a 2D barcode reader. The secure token can also be a 1D bar code or a one-time passcode. The secure token can be various types of tokens that are redeemable via an external entity. Examples of use cases include using a token to represent a stored value card, loyalty card, or a one-time use event ticket. In one or more embodiments, time stamps (or other time information) can be utilized with the secure token in order to provide a validity time. Secure tokens and modified secure tokens can have validity times associated with them. These validity times can be utilized for various purposes, including creating a time window for use of the token or monitoring usage of the tokens. In one or more embodiments, the validity time for the secure token and/or modified secure token can be maintained in the secure token application function. In another embodiment, a timestamp for the secure token can be recorded or otherwise stored in the secure token application function while the timestamp for the modified secure token is recorded by the secure element (e.g., UICC).

Figure 2:
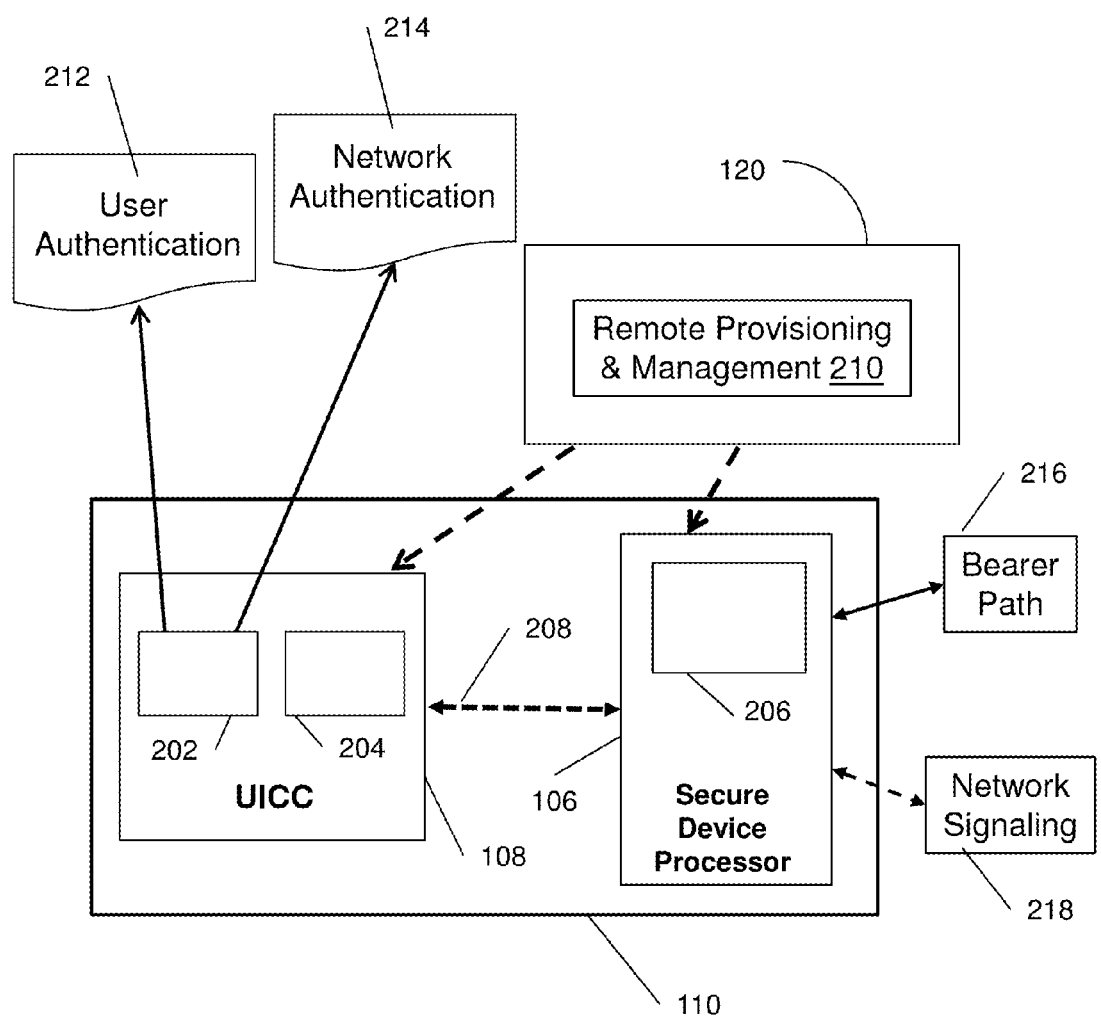
FIG. 2 depicts an illustrative embodiment of a system including the communication device of FIG. 1 implementing authentication and management functions.

FIG. 2 is a schematic illustration 200 showing details of a secure services platform 110, according to an embodiment of the disclosure, which can be used with the communication device 102 of FIG. 1. The secure element 108 (in this embodiment, a UICC) can contain an authentication management function 202 and a real-time encryption key generator 204. The authentication management function 202 can provide authentication services for the device. For example, the authentication management function 202 can support mutual authentication of devices, support a mutual authentication of the device, such as with the remote management server 120 of FIG. 1. As shown in FIG. 2, the authentication management function 202 can include a user authentication service 212 for authenticating the user to the device and a network authentication service 214 for authenticating the device to network equipment. The real-time encryption key generator 204 can supply encryption keys to a real-time encryption engine 206 which is located in the SDP 106. The real-time encryption engine 206 can encrypt and decrypt user information transmitted to or from a bearer path 216 that terminates at another device (e.g., another user device), and may encrypt and decrypt information transmitted on a signaling path 218 to the network. In another embodiment, the encryption engine can be loaded on a second secure element, separate from the secure element 108.

The remote management server 120 can perform a remote provisioning and management function 210 to load applications and/or content into the secure element (e.g., UICC) 108 and SDP 106. In this embodiment, the remote management server 120 can provision the authentication management function 202 and real-time encryption key generator 204 on the UICC 108, and can provision the real-time encryption engine 206 on the SDP 106. This can be done securely by the use of one or more remote management keysets. In one embodiment, before the secure services platform 110 can be used for communication, the SDP 106 can be authenticated by the UICC 108. In one embodiment, this can be done using a UICC-SDP keyset. The UICC-SDP keyset may be provisioned remotely by the remote management server 120 or locally by an authorized user. In this embodiment, after the UICC 108 and SDP 106 are mutually authenticated using the UICC-SDP keyset, they can communicate via a signaling path 208 within the secure services platform 110. The UICC-SDP keyset may be used for both secure communication and secure token during initial loading and provisioning. However, the keys being utilized may be different. The secure token renderer (in the SDP) and the secure token management function (in the secure element) mutually authenticate with each other. Alternatively, the path between the UICC 108 and the SDP 106 can go through the device processor 104 rather than directly between the UICC and the SDP.

In this embodiment of FIG. 2, the secure element 108 can receive a secure token and can receive instructions from the remote management server 120 which in turn received the instructions from the secure token application function 150. The secure element 108 can store the secure token. The secure element 108 can execute the received instructions. The secure element 108 can generate or otherwise provide the modified secure token by adding additional information to the secure token such as a user ID, a timestamp, and/or a digital signature. In one embodiment, the secure element 108 can further encrypt the secure token (for a second encryption layer).

In this embodiment of FIG. 2, the SDP 106 can receive secure token descriptors from the secure token application function 150 and can store the descriptors. The SDP 106 can bind the secure token stored in the secure element 108 with its corresponding secure token descriptors. The SDP 106 can provide a user interface to the user. The SDP 106 can notify the user of a successful download of the secure token and secure token descriptors. The SDP 106 can display the content of its secure token descriptor storage to the user. The SDP 106 can retrieve a modified secure token from the secure element 108 and can render the modified secure token for transmission to a receiving entity device. Other communication configurations can be utilized in the exemplary embodiments for interaction between the secure element 108 and the SDP 106, such as described in U.S. Ser. No. 14/023,932 to Chastain, the disclosure of which is incorporated by reference herein in its entirety.

In one embodiment, the phases of the token can be as follows:
Token—first_encryption→Secure Token—second_encryption+INFO→Modified Secure Token—first_decryption+INFO_Analysis→Secure Token—second_decryption→Token
or
Secure Token—first_encryption→Encrypted Secure Token—second_encryption+INFO→Modified Secure Token—first_decryption+INFO_Analysis→Encrypted Secure Token—second_decryption→Secure Token
In one or more embodiments, the first_encryption and second_decryption can use a transport key.

Figure 3:
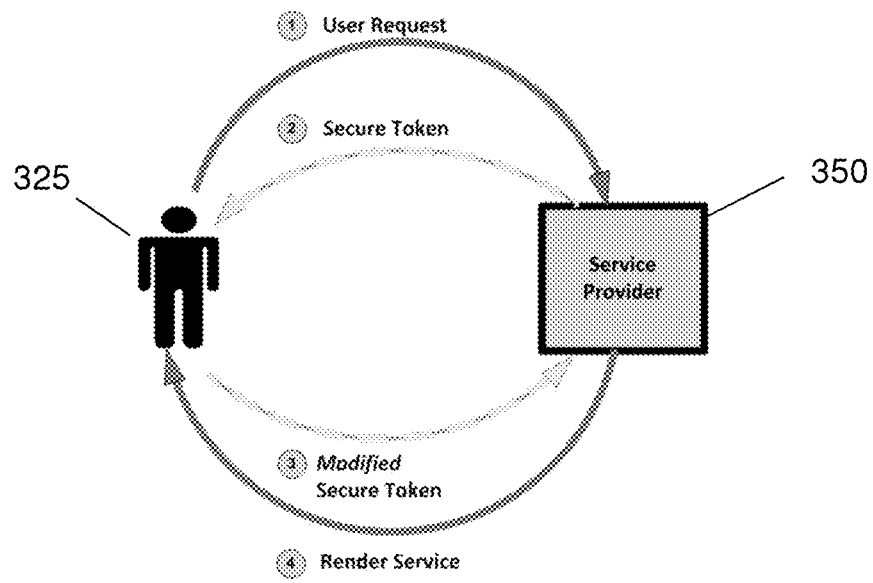
FIG. 3 depicts an illustrative embodiment of distribution and use of secure tokens.

Referring to system 300 of FIG. 3, a general overview of one exemplary embodiment for managing the communications of secure tokens is illustrated. System 300 includes a user 325 in communication with a service provider 350 via communication devices that are not shown. The user 325 can make a request (e.g., via his or her end user device) associated with obtaining a secure token. In other embodiments, the request can originate from a source other than the end user device, such as from a different end user device or from a network element. The secure token can be of various forms such as a 1D bar code, a 2D bar code, a one-time passcode and so forth. A secure token can be provided from the service provider 350 to the end user device of user 325. The secure token can be encrypted and can be provided with limited accessibility, such as being provided by a remote management server using keysets to a secure element of the end user device whereby the secure element stores the encrypted secure token and prevents other components of the end user device (e.g., the secure device processor and/or the device processor) from directly accessing the enclosed secure token.

System 300 enables transmission of a modified secure token from the end user device of user 325 to the service provider 350, such as via a receiving device to the secure token application function. The modified secure token can be generated utilizing various techniques and various additional information, such as using a hash function to add one or more of a digital certificate, a time stamp and user ID to the encrypted secure token. Based on receipt of the modified secure token by the service provider and an analysis of the modified secure token (e.g., authentication, verification, timeliness, value, information stored therein, and so forth), the service provider can render a service or provide some benefit that is associated with the secure token to an end user, such as via the receiving device. System 300 provides a general illustration of the use of the secure tokens in one embodiment. Various other components and techniques can be used in conjunction with system 300 for managing the secure tokens of the exemplary embodiments.

Figure 4:
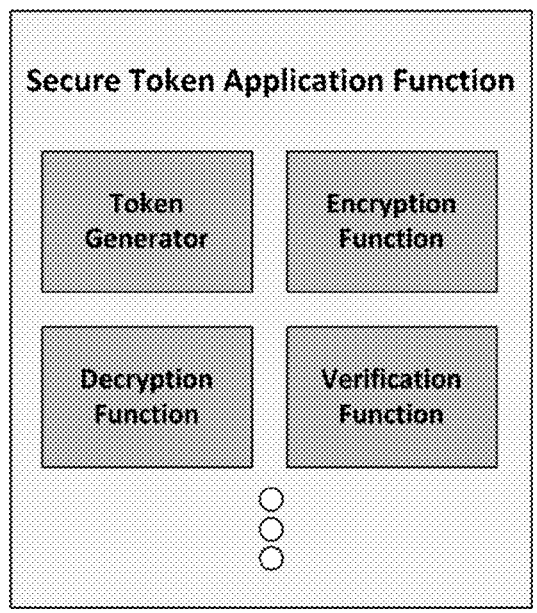
FIG. 4 depicts an illustrative embodiment of a secure token application function server that can be used for managing secure tokens.

Referring to FIG. 4, a secure token application function 400 is illustrated which can be similar to server 150 of FIG. 1. Server 400 can include several component functions such as a token generator function, encryption function, decryption function, and/or a function to verify the additional information that was added to create the modified secure token (e.g., verification function). In one or more embodiments, the token generator function can generate a token in response to a request from the user (e.g., a token can be a 2D barcode). The encryption function can be used to encrypt the token for transmission to the secure element 108. In one embodiment, the encryption function can also decrypt the encrypted secure token that it previously encrypted. The decryption function can be used to decrypt a modified secure token if the modified secure token was encrypted by the secure element. The verification function can verify the additional information provided in the modified secure token to ensure the authenticity and validity of it. As an example, additional information can include a digital signature (e.g., for authenticity), a user ID (e.g., for authenticity and validity), and/or a timestamp (e.g., for validity).

Referring to FIGS. 5A-5C, in system 500, the secure element (e.g. the UICC) can include a secure token management function which stores secure tokens (e.g., in encrypted form) which are downloaded from the secure token application function via the remote management function. When the user consumes the secure token, it can be activated by the secure token management function, such as by adding information to it such as a digital signature, user ID, and/or a timestamp. This can be done in a number of different ways such as in the form of a hash. The activated secure token can then be encrypted for transmission by the secure token management function. In one or more embodiments, the activated secure token is a modified secure token. The modified secure token can be transmitted to the secure token renderer where it is rendered for transmission to a receiving entity. The secure element (e.g., UICC) can include the secure token management function which can perform a number of tasks such as receiving secure tokens and additional instructions from the remote management function which in turn receives them from the secure token application function; storing secure tokens; executing instructions provided by the secure token application function via the remote management function; creating a modified secure token by adding additional information such as a user ID and timestamp, and/or adding a digital signature; and/or encrypting the secure token (e.g., encryption for a second time).

In system 500, the secure device processor can include the secure token renderer which can perform a number of tasks: receiving secure token descriptors from the secure token application function and storing them in secure token descriptor storage; binding secure tokens stored in the secure token management function with their corresponding secure token descriptors; providing a user interface to the user; notifying the user of successful download of secure tokens and secure token descriptors; displaying the content of secure token descriptor storage to the user; retrieving modified secure tokens from the secure token management function and rendering them for transmission to a receiving entity; and/or presenting secure tokens to the receiving entity.

In system 500, the secure download application function can perform a number of tasks: maintaining user information; processing requests from the user to download secure tokens and secure token descriptors; verifying that the user has the proper credentials and permissions before allowing access to browse and download secure tokens; creating and encrypting secure tokens for transmission; decrypting, analyzing, and verifying modified secure tokens received from a receiving entity; notifying the receiving entity whether or not the received modified secure token was accepted; and/or providing additional instructions for the handling of previously downloaded secure tokens.

In system 500, the remote management server can create and load the secure token applications described above into both the secure element and the secure device processor. It can also transmit the secure tokens as well as additional instructions from the secure token application function to the secure element. In one or more embodiments, these operations can be done securely by the use of one or more remote management keysets. These keysets can be used to mutually authenticate the secure element (e.g., UICC) and secure device processor with the remote management server and to enable encryption between them.

In one or more embodiments, secure tokens can be instruments of value that can be securely transmitted to a device such as a smartphone, securely stored within the device, and securely consumed by a user. Secure tokens can take many forms, including 2D barcodes. In one or more embodiments, secure tokens can be transmitted to a user from an application function and then during consumption of the token can be transmitted from the user back to the application function in a modified form that contains information used to verify the authenticity and validity of the secure token. This additional information can reduce the chance of fraudulent use after the secure token has been rendered for consumption. The additional information can include user IDs, time stamps, and/or digital signatures. The secure token can be encrypted by the secure token application function and/or by the secure token management function utilizing various encryption techniques. The transmission of secure tokens can be initiated by the user from any device, including a smartphone. Secure tokens can be generated by a secure token application function which includes a token generator function.

In one or more embodiments, secure tokens can be loaded into the secure element, which may exist within the UICC, from the network using a very highly secure process such as based on global platform standards. This path can be separate and isolated from the path in which a modified secure token is transmitted from the secure element to the network during the rendering and consumption of the token. In one embodiment, secure tokens do not leave the secure element in unmodified form. They can be modified into modified secure tokens for transmission out of the secure element. Secure token descriptors can be separate from secure tokens and can contain information that describes the secure token to the user.

In one or more embodiments, secure token descriptors can be transmitted from the secure token application function to the secure device processor where they are stored and linked to secure tokens stored in the secure element. The secure token renderer can display the contents of secure token storage to the user. The secure token application function can verify the credentials and/or permissions stored within it to see if requested secure tokens can be downloaded to the user/device. The secure token application function may make changes to secure tokens stored within the secure element. Secure tokens can be transmitted from the secure token application function to the secure element using a path that is separate from the path in which the modified secure token is transmitted to the secure token application function. Secure tokens and/or instructions can be sent from the secure token application function to the secure element via the remote management function. The remote management function can provide a set of encryption keys and/or digital signature certificates to the secure token application function. The applications can be loaded and provisioned remotely by the remote management function.

Figure 6A:
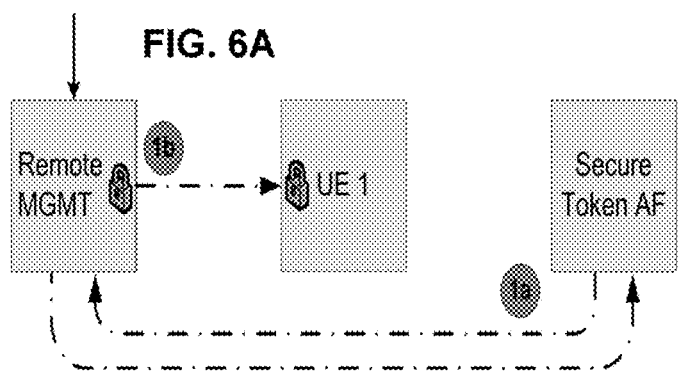
FIGS. 6A-6C depict an illustrative embodiment of a system that can be used for provisioning applications for managing secure tokens.
Figure 6B:
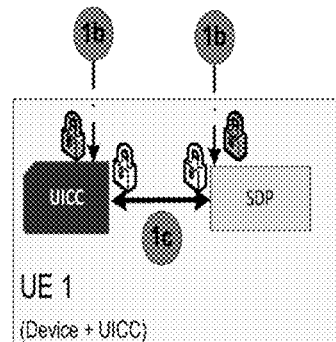
Figure 6C:
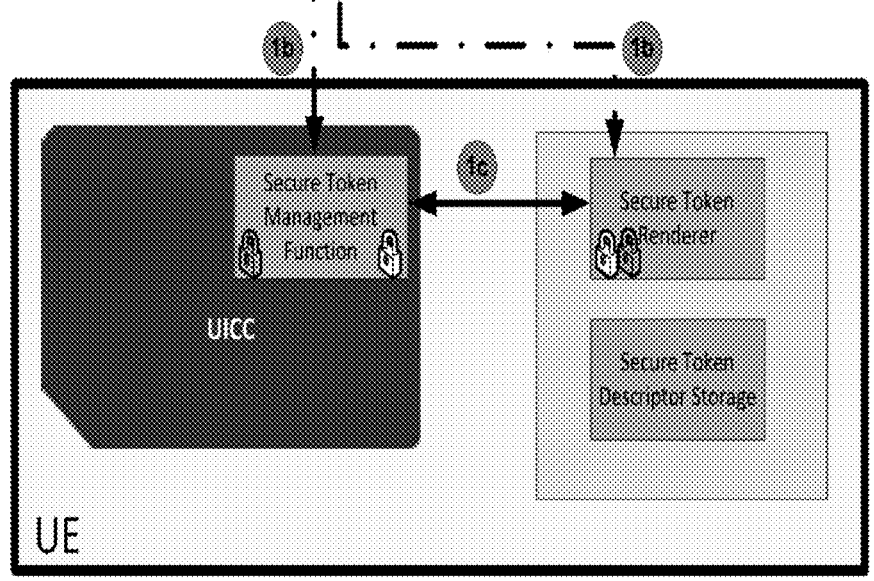

Referring to FIGS. 6A-6C, system 600 illustrates provisioning of applications that facilitate the management of secure tokens. For example, there are two applications that can be loaded, the secure token management function and the secure token renderer. In one embodiment, the applications can be loaded at the time of manufacture (e.g., at the factory). In another embodiment, at step 1a, upon receiving a request for the service, the secure token application function can instruct the remote management server to download the secure token management function to the UICC and the secure token renderer to the SDP. At step 1b, the remote management server can download the secure token management function to the UICC and the secure token renderer to the SDP. The secure token management function can contain transport keys used to encrypt and decrypt data from the secure token application function. Remote management keysets can be used to securely transmit information from the remote management server to the end user devices. This process can include mutual authentication and encryption. At step 1c, the UICC and SDP can mutually authenticate with each other once the two are provisioned using a UICC-SDP Keyset. At step 1d, the remote management function can provide a transport key or a set of transport keys and a digital signature certificate or set of digital signature certificates to the secure token application function.

Referring to FIGS. 7A-7C, system 700 illustrates requesting a secure token. This process involves user selection from the secure token application function, the downloading of the secure token from the secure token application function to the UICC, the download of the secure token descriptor to the SDP, and the storage of the secure token descriptor. In one embodiment, the request for content and applications may also be initiated by the device or the network. At step 2a, the user can make a request to the secure token application function that results in the download of a token. The user request may originate from any endpoint, including the mobile device. At step 2b, the secure token application function can verify that the user request can be fulfilled. It will prepare a secure token and a secure token descriptor to be transmitted to the user. The secure token can be encrypted using a transport key that was provided to it by the remote management function in step 1d. At step 2c, the secure token application function can transmit the secure token descriptor to the SDP. The secure token descriptor can be encrypted. At step 2d, the secure token renderer can receive the secure token descriptor and can store it in secure token storage. At step 2e, the secure token application function can transmit the encrypted secure token to the remote management function which then transmits it to the UICC using remote management keysets. At step 2f, the secure token management function can store the secure token. At step 2g, the secure token management function notifies the secure token renderer that the secure token has been received. At step 2h, the secure token renderer can notify the user that both the secure token and secure token descriptor have been downloaded and are ready to use.

Referring to FIGS. 8A-8C, system 800 illustrates presenting a secure token. This process involves the user selection of a token to be presented to a receiving device such as a token reader. At step 3a, the user browses a list of available secure tokens which are stored in secure token storage and displayed to the user by the secure token renderer. At step 3b, the user can select a specific secure token to render and the secure token renderer requests the secure token from the secure token management function. At step 3c, the secure token management function can receive the request for the secure token and can verify that it is able to fulfill the request. It then can add additional information to the token to ensure the authenticity of the rendered secure token. This additional information can include user identify information and/or a timestamp indicating when the request was made. Once the additional information is added to the secure token, the secure token management function can add a digital signature and can encrypt the secure token a second time, resulting in a modified secure token. In this embodiment, the modified and doubly encrypted secure token can now be transmitted to the secure token renderer for rendering. At step 3d, the secure token renderer renders the modified secure token for transmission to a receiving entity. In this example, the secure token can be a 2D barcode and the receiving entity can be a 2D barcode reader. The 2D barcode can be displayed using the smartphone display to a barcode reader. At step 3e, the receiving entity can transmit the received modified secure token to the secure token application function. The secure token application function can receive the modified secure token and can perform a number of operations or functions including: decrypting the modified secure token and verifying the digital signature; analyzing the additional information such as the timestamp and user ID; decrypting the secure token; and/or analyzing the secure token. At step 3f, the secure token application function can provide a response back to the receiving entity. This response can indicate whether or not the secure token was accepted. At step 3g, the secure token application function can prepare a set of instructions to be transmitted to the secure token management function. These instructions are transmitted to the remote management function and then transmitted to the UICC using a remote management keyset. These instructions can instruct the secure token management function to delete the secure token, replace it with another secure token, rotate the encryption keys, and/or adjust other parameters related to the secure token and its rendering. At step 3h, the secure token application function can notify the secure token renderer if the secure token has been deleted. The secure token render can take appropriate action such as updating or deleting the secure token descriptor.

Figure 9:
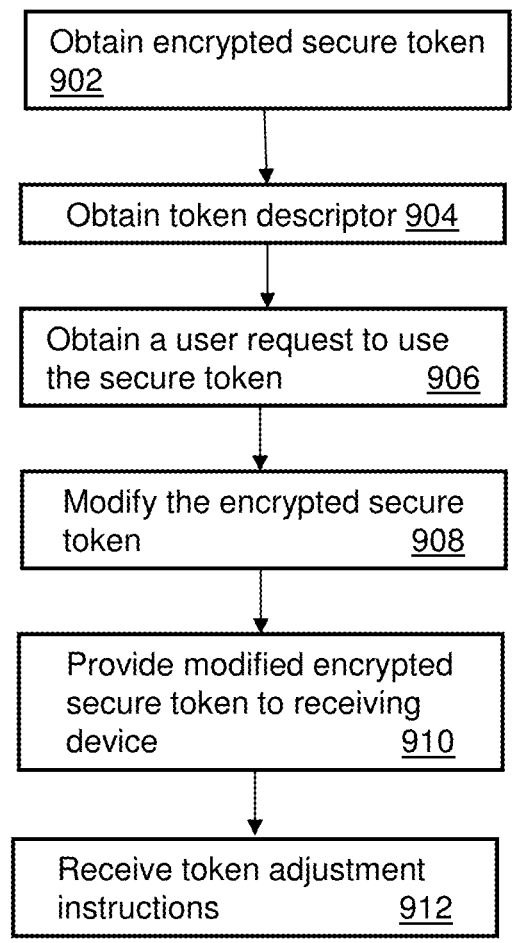
FIG. 9 depicts an illustrative embodiment of a method used in portions of the systems described in FIGS. 1-3 and 5-8.

FIG. 9 depicts an illustrative embodiment of a method used by a communication device, such as device 102, for managing secure tokens that can be utilized by the communication device for various purposes, such as discounts, purchases, information exchange and so forth. For example, the secure token can be a 2D barcode, a 1D bar code or a one-time passcode. The secure token can be various types of tokens that are redeemable via an external entity. Examples of uses cases include using a token to represent a stored value card, loyalty card, and a one-time use event ticket. Method 900 is described with respect to the network architecture of FIG. 1 but other architectures can also be utilized. Method 900 can begin at 902 where the secure element (e.g., UICC) 108 of the communication device 102 receives an encrypted secure token from the secure token application function 150 that is remote from the communication device. In one embodiment, the encrypted secure token can be stored in a secure element memory of the secure element 108. The secure element memory can be a separate memory from other memory devices of the communication device 102 or can be otherwise maintained as secure by the secure element.

At 904, a token descriptor (e.g., including information that is descriptive or otherwise indicative of the secure token) can be received by the secure device processor 106 from the secure token application function 150. The secure token descriptor can be stored, for example, in a secure device processor memory. The secure element memory can be a separate memory from the secure element and/or other memory devices of the communication device 102 or can be otherwise maintained as secure by the secure device processor. The level of security or level of access provided to the secure device processor memory can be different than the level of security or level of access provided to the secure element.

At 906, the secure device processor 106 of the communication device 102 can access user input (e.g., received by device processor 104) requesting consumption of the encrypted secure token. In one embodiment, the user input can be a selection based on the token descriptor, such as a listing of available secure tokens provided in a GUI based on token descriptors for each of the available secure tokens.

At 908, the secure element 108 can generate a modified secure token by adding identification information to the encrypted secure token and/or by performing a second encryption of the encrypted secure token with the identification information. The identification information can be various types, such as a digital signature, a time stamp, user IDs, and so forth. In one embodiment, the addition of the identification information to the encrypted secure token is via a hash function. In this embodiment, the identification information can be added to the encrypted secure token without decrypting the encrypted secure token. The secure element 108 can provide the modified secure token (with the additional identification information attached thereto) to the secure device processor 106 without providing the encrypted secure token to the secure device processor.

At 910, the secure device processor 106 can provide the modified secure token to a receiving device (e.g., a 2D bar code reader, another mobile device, a remote server analyzing one-time event tickets, and so forth). In one or more embodiments, the receiving device can provide the modified secure token to the secure token application function. This can enable the secure token application function to decrypt the modified secure token to analyze the identification information. This can further enable the secure token application function to decrypt the encrypted secure token to access a decrypted secure token including token information for use by the receiving device. In one embodiment, wireless communications can be provided between the communication device and the receiving device utilizing a device processor of the communication device, where the device processor is separate from the secure device processor and in communication with the secure device processor. In another embodiment, the receiving of the encrypted secure token from the secure token application function by the secure element is via a remote management server 120, where keysets are utilized for mutual authentication of the secure element and the secure device processor with the remote management server. At 912, the secure element 108 can receive token adjustment instructions from the secure token application function 150. In this example, the token adjustment instructions can be received via a remote management server 120. Keysets can be utilized for mutual authentication of the secure element 108 and the secure device processor 106 with the remote management server 120. In one embodiment, the token adjustment instructions can include a command to delete the encrypted secure token from the secure element memory, a command to replace the encrypted secure token in the secure element memory with another encrypted secure token, and/or a command to change encryption keys associate with the encrypted secure token stored in the secure element memory.

Figure 10:
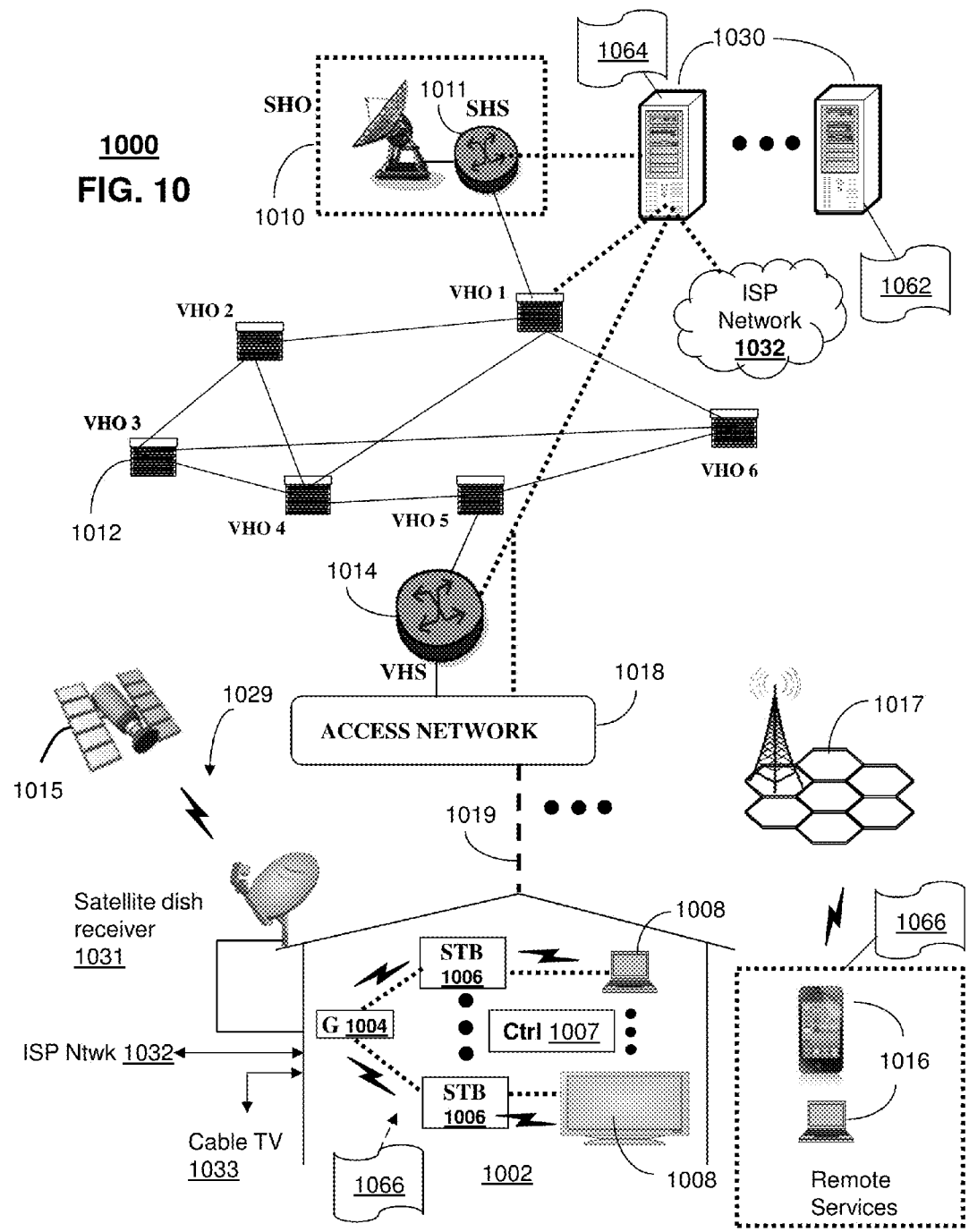
FIG. 10 depicts an illustrative embodiment of a communication system that provides media services including management and usage of secure tokens.

FIG. 10 depicts an illustrative embodiment of a communication system 1000 for delivering media content. The communication system 1000 can represent an Internet Protocol Television (IPTV) media system. Communication system 1000 can be overlaid or operably coupled with systems 100, 200 of FIGS. 1 and 2 as another representative embodiment of communication system 1000. In one or more embodiments, system 1000 enables providing a token descriptor to a secure device processor of a communication device for storage at the secure device processor, and providing an encrypted secure token to a secure element of the communication device for storage at the secure element. System 1000 enables obtaining a modified secure token from a receiving device that obtained the modified secure token from the communication device according to user input associated with the token descriptor. System 1000 enables decrypting the modified secure token to obtain the encrypted secure token and to obtain identification information including a digital signature. System 1000 enables verifying the digital signature and decrypting the encrypted secure token to obtain a secure token. System 1000 enables analyzing the secure token to obtain token information and enables providing a notification to the receiving device indicating an acceptance or denial of the token information.

The IPTV media system can include a super head-end office (SHO) 1010 with at least one super headend office server (SHS) 1011 which receives media content from satellite and/or terrestrial communication systems. In the present context, media content can represent, for example, audio content, moving image content such as 2D or 3D videos, video games, virtual reality content, still image content, and combinations thereof. The SHS server 1011 can forward packets associated with the media content to one or more video head-end servers (VHS) 1014 via a network of video head-end offices (VHO) 1012 according to a multicast communication protocol.

The VHS 1014 can distribute multimedia broadcast content via an access network 1018 to commercial and/or residential buildings 1002 housing a gateway 1004 (such as a residential or commercial gateway). The access network 1018 can represent a group of digital subscriber line access multiplexers (DSLAMs) located in a central office or a service area interface that provide broadband services over fiber optical links or copper twisted pairs 1019 to buildings 1002. The gateway 1004 can use communication technology to distribute broadcast signals to media processors 1006 such as Set-Top Boxes (STBs) which in turn present broadcast channels to media devices 1008 such as computers or television sets managed in some instances by a media controller 1007 (such as an infrared or RF remote controller).

The gateway 1004, the media processors 1006, and media devices 1008 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 1006 and subsystems of the IPTV media system for services such as video-on-demand (VoD), browsing an electronic programming guide (EPG), or other infrastructure services.

A satellite broadcast television system 1029 can be used in the media system of FIG. 10. The satellite broadcast television system can be overlaid, operably coupled with, or replace the IPTV system as another representative embodiment of communication system 1000. In this embodiment, signals transmitted by a satellite 1015 that include media content can be received by a satellite dish receiver 1031 coupled to the building 1002. Modulated signals received by the satellite dish receiver 1031 can be transferred to the media processors 1006 for demodulating, decoding, encoding, and/or distributing broadcast channels to the media devices 1008. The media processors 1006 can be equipped with a broadband port to an Internet Service Provider (ISP) network 1032 to enable interactive services such as VoD and EPG as described above.

In yet another embodiment, an analog or digital cable broadcast distribution system such as cable TV system 1033 can be overlaid, operably coupled with, or replace the IPTV system and/or the satellite TV system as another representative embodiment of communication system 1000. In this embodiment, the cable TV system 1033 can also provide Internet, telephony, and interactive media services.

The subject disclosure can apply to other present or next generation over-the-air and/or landline media content services system.

Some of the network elements of the IPTV media system can be coupled to one or more computing devices 1030, a portion of which can operate as a web server for providing web portal services over the ISP network 1032 to wireline media devices 1008 or wireless communication devices 1016.

Communication system 1000 can also provide for computing devices 1030 to function as a remote management server and/or a secure token application function (herein referred to as server 1030). The server 1030 can use computing and communication technology to perform function 1062, which can include among other things, providing token descriptors, providing encrypted secure tokens, obtaining modified secure tokens from receiving devices that obtained the modified secure tokens from communication devices, decrypting modified secure tokens, verifying digital signatures, decrypting encrypted secure tokens, analyzing secure tokens to obtain token information, and/or providing notifications to receiving devices indicating an acceptance or denial of the token information. The server 1030 can use computing and communication technology to perform function 1064, which can include among other things, creating and loading secure token applications into both the secure element 108 (e.g., UICC) and the secure device processor 106, transmits secure tokens as well as additional instructions from the secure token application function to the secure element. These operations can be done securely by the use of one or more remote management keysets. These keysets can be used to mutually authenticate the secure element 108 and the secure device processor 106 with the remote management server 120 and to enable encryption between them.

The media processors 1006 and wireless communication devices 1016 can be provisioned with software functions 1066, to utilize the services of server 1030. Functions 1066 can include functions being performed at the secure element 108 including generating modified secure tokens from the encrypted secure tokens by adding identification information such as digital certificates, time stamps, and/or user IDs. Functions 1066 can also include functions being performed at the secure device processor 106 such as transmitting the modified secure token to the server 1030 and interacting with the user and/or the device processor of the communication device.

Multiple forms of media services can be offered to media devices over landline technologies such as those described above. Additionally, media services can be offered to media devices by way of a wireless access base station 1017 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 11:
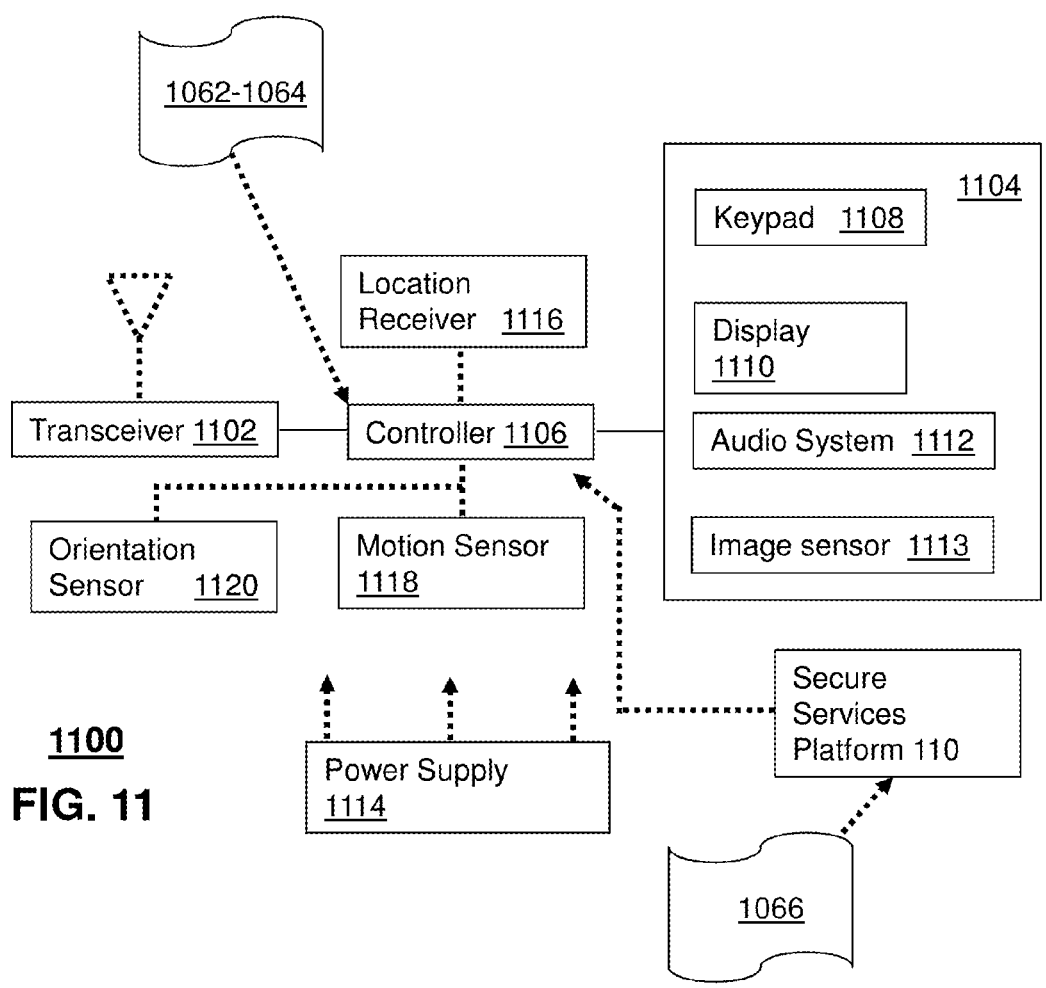
FIG. 11 depicts an illustrative embodiment of a communication device that can utilize secure tokens.

FIG. 11 depicts an illustrative embodiment of a communication device 1100. Communication device 1100 can serve in whole or in part as an illustrative embodiment of the devices depicted in FIGS. 1-8 and 10. For instance, device 1100 can include a secure element and a secure device processor in the secure services platform 110. The secure element can have a secure element memory with first executable instructions, wherein the secure element, responsive to executing the first executable instructions, performs first operations that include receiving an encrypted secure token from the secure token application function 150 that is remote from the communication device, and storing the encrypted secure token in the secure element memory. The secure device processor can have a secure device processor memory with second executable instructions, where the secure device processor is separate from the secure element and in communication with the secure element, and where the secure device processor, responsive to executing the second executable instructions, performs second operations including accessing user input requesting the encrypted secure token. The secure device processor can receive a modified secure token from the secure element, where the modified secure token is generated by the secure element by adding identification information to the encrypted secure token and by performing a second encryption of the encrypted secure token with the identification information. The secure device processor can provide the modified secure token to a receiving device to enable the receiving device to provide the modified secure token to the secure token application function for decrypting the modified secure token to analyze the identification information and to generate the encrypted secure token at the secure token application function. In this example, the secure token application function 150 can decrypt the encrypted secure token to generate a secure token including token information for use by the receiving device.

To enable these features, communication device 1100 can comprise a wireline and/or wireless transceiver 1102 (herein transceiver 1102), a user interface (UI) 1104, a power supply 1114, a location receiver 1116, a motion sensor 1118, an orientation sensor 1120, and a controller 1106 for managing operations thereof. The transceiver 1102 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, NFC, as well as other next generation wireless communication technologies as they arise. The transceiver 1102 can also be adapted to support circuit-switched wireline access technologies (such as PSTN), packet-switched wireline access technologies (such as TCP/IP, VoIP, etc.), and combinations thereof.

The UI 1104 can include a depressible or touch-sensitive keypad 1108 with a navigation mechanism such as a roller ball, a joystick, a mouse, or a navigation disk for manipulating operations of the communication device 1100. The keypad 1108 can be an integral part of a housing assembly of the communication device 1100 or an independent device operably coupled thereto by a tethered wireline interface (such as a USB cable) or a wireless interface supporting for example Bluetooth. The keypad 1108 can represent a numeric keypad commonly used by phones, and/or a QWERTY keypad with alphanumeric keys. The UI 1104 can further include a display 1110 such as monochrome or color LCD (Liquid Crystal Display), OLED (Organic Light Emitting Diode) or other suitable display technology for conveying images to an end user of the communication device 1100. In an embodiment where the display 1110 is touch-sensitive, a portion or all of the keypad 1108 can be presented by way of the display 1110 with navigation features. In one embodiment, the display 1110 can be used to transmit the modified secure token to the reader device.

The display 1110 can use touch screen technology to also serve as a user interface for detecting user input. As a touch screen display, the communication device 1100 can be adapted to present a user interface with graphical user interface (GUI) elements that can be selected by a user with a touch of a finger. The touch screen display 1110 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1110 can be an integral part of the housing assembly of the communication device 1100 or an independent device communicatively coupled thereto by a tethered wireline interface (such as a cable) or a wireless interface.

The UI 1104 can also include an audio system 1112 that utilizes audio technology for conveying low volume audio (such as audio heard in proximity of a human ear) and high volume audio (such as speakerphone for hands free operation). The audio system 1112 can further include a microphone for receiving audible signals of an end user. The audio system 1112 can also be used for voice recognition applications. The UI 1104 can further include an image sensor 1113 such as a charged coupled device (CCD) camera for capturing still or moving images.

The power supply 1114 can utilize common power management technologies such as replaceable and rechargeable batteries, supply regulation technologies, and/or charging system technologies for supplying energy to the components of the communication device 1100 to facilitate long-range or short-range portable applications. Alternatively, or in combination, the charging system can utilize external power sources such as DC power supplied over a physical interface such as a USB port or other suitable tethering technologies.

The location receiver 1116 can utilize location technology such as a global positioning system (GPS) receiver capable of assisted GPS for identifying a location of the communication device 1100 based on signals generated by a constellation of GPS satellites, which can be used for facilitating location services such as navigation. The motion sensor 1118 can utilize motion sensing technology such as an accelerometer, a gyroscope, or other suitable motion sensing technology to detect motion of the communication device 1100 in three-dimensional space. The orientation sensor 1120 can utilize orientation sensing technology such as a magnetometer to detect the orientation of the communication device 1100 (north, south, west, and east, as well as combined orientations in degrees, minutes, or other suitable orientation metrics). In one or more embodiments, GPS information can be utilized for modification of the secure token, such as adding (e.g., via a hash function or other techniques) location information as the added additional information for the encrypted secure token.

The communication device 1100 can use the transceiver 1102 to also determine a proximity to a cellular, WiFi, Bluetooth, or other wireless access points by sensing techniques such as utilizing a received signal strength indicator (RSSI)

and/or signal time of arrival (TOA) or time of flight (TOF) measurements. The controller 1106 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 11 can be used in one or more embodiments of the subject disclosure. For instance, the communication device 1100 can include a reset button (not shown). The reset button can be used to reset the controller 1106 of the communication device 1100. In yet another embodiment, the communication device 1100 can also include a factory default setting button positioned, for example, below a small hole in a housing assembly of the communication device 1100 to force the communication device 1100 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 1100 as described herein can operate with more or less of the circuit components shown in FIG. 11. These variant embodiments can be used in one or more embodiments of the subject disclosure.

The communication device 1100 can be adapted to perform the functions of the media processor 1006, the media devices 1008, or the portable communication devices 1016 of FIG. 10. It will be appreciated that the communication device 1100 can also represent other devices that can operate in communication system 1000 of FIG. 10, such as a gaming console and a media player.

The communication device 1100 shown in FIG. 11 or portions thereof can serve as a representation of one or more of the devices of FIGS. 1-8 and 10 including end user devices, customer premises equipment, remote management servers, and/or secure token application functions. In addition, the controller 1106 can communicate with the secure services platform to perform the functions 1060 or can perform functions 1062 or 1064.

Upon reviewing the aforementioned embodiments, it would be evident to an artisan with ordinary skill in the art that said embodiments can be modified, reduced, or enhanced without departing from the scope of the claims described below. For example, both the UICC and SDP can be used together to provide a platform for the secure delivery, management, and consumption of tokens. In another example, cryptographic operations can be used to create, store, and transmit secure tokens. In one example, the SDP can be used to interact with the user, UICC, and/or secure token application function. In another example, the UICC can be used to store secure tokens. In one example, the UICC can be used to modify the secure tokens for secure rendering and consumption. In another example, the SDP can be used to render secure tokens for transmission to a receiving entity. Secure tokens can take many forms, including that of a 2D barcode. In one example, the UICC and/or SDP can be subject to secure remote management. In another example, the UICC can be subject to secure remote management to perform operations on previously downloaded secure tokens. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

In one exemplary process, management of secure tokens is as follows: (1) the user can request a token; (2) the secure token application function can create a secure token (and may store it); (3) the secure token application function can encrypt the secure token using transport key (and may store it); (4) the secure token application function can send the encrypted secure token to the UICC and the descriptor to the SDP; (5) the user wants to use the token and can select it based on the descriptor; (6) the UICC can create a modified secure token; (7) the secure device processor can send the modified secure token via a receiving entity device to the secure token application function; (8) the secure token application function can decrypt the modified secure token and can analyze additional information; (9) the secure token application function may further decrypt using a transport key and can compare the received secure token with the one it created and stored; (10) the secure token application function can notify the receiving entity device; and (11) the secure token application function can update the UICC.

In one or more embodiments, the encrypted secure token can be selected by various means and/or various selecting entities. For example, the encrypted secure token can be selected by: the user of the communication device, an application being executed on the communication device (e.g., being executed by the device processor or by the SDP), and/or a remote device (e.g., a reader device). The selection of the encrypted secure token can be based on various techniques, including based on the token descriptors. In one embodiment, the token descriptors can be made available or made otherwise accessible to applications within the communication device and/or to a receiving entity (i.e., the remote device). In one embodiment, the secure token render can process inputs from the user and also from another application and/or receiving device.

Figure 12:
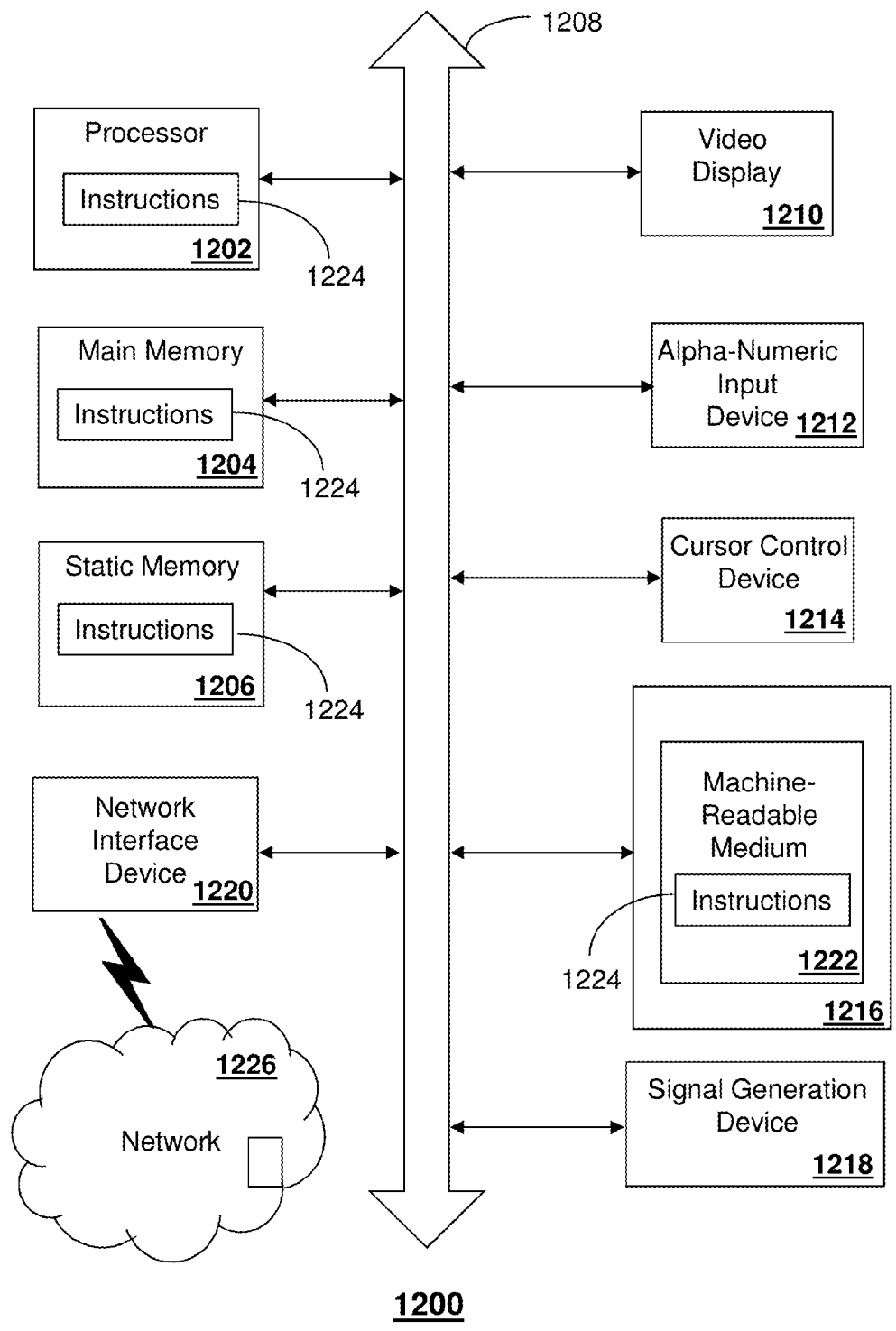
FIG. 12 is a diagrammatic representation of a machine in the form of a computer system within which a set of instructions, when executed, may cause the machine to perform any one or more of the methods described herein.

FIG. 12 depicts an exemplary diagrammatic representation of a machine in the form of a computer system 1200 within which a set of instructions, when executed, may cause the machine to perform any one or more of the methods described above. One or more instances of the machine can operate, for example, as the remote management server, the secure token application function, the secure services platform, and so forth. In some embodiments, the machine may be connected (e.g., using a network 1226) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1200 may include a processor (or controller) 1202 (e.g., a central processing unit (CPU), a graphics processing unit (GPU, or both), a main memory 1204 and a static memory 1206, which communicate with each other via a bus 1208. The computer system 1200 may further include a display unit 1210 (e.g., a liquid crystal display (LCD)), a flat panel, or a solid state display. The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220. In distributed environments, the embodiments described in the subject disclosure can be adapted to utilize multiple display units 1210 controlled by two or more computer systems 1200. In this configuration, presentations described by the subject disclosure may in part be shown in a first of the display units 1210, while the remaining portion is presented in a second of the display units 1210.

The disk drive unit 1216 may include a tangible computer-readable storage medium 1222 on which is stored one or more sets of instructions (e.g., software 1224) embodying any one or more of the methods or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1222 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP, NFC) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 1200.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. Additionally, features such as components or steps that are positively recited in one or more of the exemplary embodiments can also be expressly excluded from the exemplary embodiments.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device comprising:
a secure element having a secure element memory with first executable instructions, wherein the secure element, responsive to executing the first executable instructions, performs first operations comprising:
receiving an encrypted secure token from a secure token application function that is remote from the communication device; and
storing the encrypted secure token in the secure element memory;
a secure device processor having a secure device processor memory with second executable instructions, wherein the secure device processor is separate from the secure element and in communication with the secure element, wherein the secure device processor, responsive to executing the second executable instructions, performs second operations comprising:
accessing user input requesting the encrypted secure token;
receiving a modified secure token from the secure element, wherein the modified secure token is generated by the secure element by adding identification information to the encrypted secure token and by performing a second encryption of the encrypted secure token with the identification information; and
providing the modified secure token to a receiving device to enable the receiving device to provide the modified secure token to the secure token application function for decrypting the modified secure token to analyze the identification information and to obtain token information for use by the receiving device,
wherein the receiving of the encrypted secure token from the secure token application function by the secure element is via a remote management server, and wherein keysets are utilized for mutual authentication of the secure element and the secure device processor with the remote management server.

2. The communication device of claim 1, wherein the secure element comprises a universal integrated circuit card, wherein the encrypted secure token comprises a two dimensional bar code, and wherein the receiving device comprises a two dimensional bar code reader.

3. The communication device of claim 2, wherein the second operations further comprise:
receiving, by the secure device processor, a secure token descriptor associated with the encrypted secure token from the secure token application function; and
storing the secure token descriptor in the secure device processor memory, wherein the user input is a selection based on the secure token descriptor.

4. The communication device of claim 1, further comprising a device processor that is separate from the secure device processor and in communication with the secure device processor, wherein the device processor facilitates wireless communications between the communication device and the receiving device.

5. The communication device of claim 1, wherein the identification information comprises a digital signature and a time stamp.

6. The communication device of claim 1, wherein the adding of the identification information to the encrypted secure token is via a hash function.

7. The communication device of claim 1, wherein the first operations further comprise:
receiving, by the secure element, token adjustment instructions from the secure token application function, wherein the token adjustment instructions are received via the remote management server.

8. The communication device of claim 7, wherein the token adjustment instructions include a command to delete the encrypted secure token from the secure element memory.

9. The communication device of claim 7, wherein the token adjustment instructions include a command to replace the encrypted secure token in the secure element memory with another encrypted secure token.

10. The communication device of claim 7, wherein the token adjustment instructions include a command to change encryption keys associate with the encrypted secure token stored in the secure element memory.

11. A method comprising:
receiving, by a secure element of a communication device, an encrypted secure token from a secure token application function that is remote from the communication device;
storing the encrypted secure token in a secure element memory of the secure element;
accessing, by a secure device processor of the communication device, a request for the encrypted secure token, wherein the secure device processor is separate from the secure element and is in communication with the secure element;
generating, by the secure element, a modified secure token by adding identification information to the encrypted secure token and by performing a second encryption of the encrypted secure token with the identification information;
receiving, by the secure device processor, the modified secure token from the secure element; and
providing, by the secure device processor, the modified secure token to a receiving device to enable the receiving device to provide the modified secure token to the secure token application function for decrypting the modified secure token to analyze the identification information and to obtain token information for use by the receiving device,
wherein the receiving of the encrypted secure token from the secure token application function by the secure element is via a remote management server, and
wherein keysets are utilized for mutual authentication of the secure element and the secure device processor with the remote management server.

12. The method of claim 11, comprising:
receiving, by the secure device processor, a secure token descriptor associated with the encrypted secure token from the secure token application function; and storing the secure token descriptor in a secure device processor memory, wherein the request for the encrypted secure token is according to a selection based on the secure token descriptor.

13. The method of claim 12, wherein the request is generated by an application being executed on the communication device and further comprising providing wireless communications between the communication device and the receiving device utilizing a device processor of the communication device, wherein the device processor is separate from the secure device processor and in communication with the secure device processor.

14. The method of claim 11, wherein the request is generated by a remote source, and wherein the identification information comprises a digital signature and a time stamp.

15. The method of claim 11, wherein the identification information is added to the encrypted secure token using a hash function.

16. The method of claim 11, comprising:
receiving, by the secure element, token adjustment instructions from the secure token application function, wherein the token adjustment instructions are received via the remote management server, and wherein the token adjustment instructions include one of a command to delete the encrypted secure token from the secure element memory, a command to replace the encrypted secure token in the secure element memory with another encrypted secure token, or a command to change encryption keys associate with the encrypted secure token stored in the secure element memory.

17. A method comprising:
providing, by a secure token application function, a token descriptor to a secure device processor of a communication device for storage at the secure device processor;
providing, by the secure token application function, an encrypted secure token to a secure element of the communication device for storage at the secure element;
receiving, by the secure token application function, a modified secure token from a receiving device that obtained the modified secure token from the communication device according to user input associated with the token descriptor;
decrypting, by the secure token application function, the modified secure token to obtain the encrypted secure token and to obtain identification information;
verifying, by the secure token application function, the identification information;
decrypting, by the secure token application function, the encrypted secure token to obtain a secure token;
analyzing, by the secure token application function, the secure token to obtain token information; and
providing, by the secure token application function, a notification to the receiving device indicating an acceptance or denial of the token information,
wherein the providing of the encrypted secure token to the secure element is via a remote management server, and
wherein keysets are utilized for mutual authentication of the secure element and the secure device processor with the remote management server.

18. The method of claim 17, comprising providing, by the secure token application function, token adjustment instructions to the secure element, wherein the token adjustment instructions are provided via the remote management server, and wherein the token adjustment instructions include one of a command to delete the encrypted secure token from the secure element, a command to replace the encrypted secure token in the secure element with another encrypted secure token, or a command to change encryption keys associate with the encrypted secure token stored in the secure element, wherein the identification information includes a digital signature.

19. The method of claim 17, comprising comparing the secure token obtained from the decrypting to another secure token that was generated and stored by the secure token application function, wherein the decrypting of the encrypted secure token to obtain the secure token utilizes a transport key.

* * * * *